(12) United States Patent
Grave et al.

(10) Patent No.: US 7,481,482 B2
(45) Date of Patent: Jan. 27, 2009

(54) MOTOR VEHICLE WITH AT LEAST ONE AERODYNAMIC SPOILER

(76) Inventors: Markus Grave, Kirkplatz 3, 49536 Lienen (DE); Friedrich Wegert, Strothmannsweg 65, 49089 Osnabrück (DE)

( * ) Notice: Subject to any disclaimer, the term of this patent is extended or adjusted under 35 U.S.C. 154(b) by 0 days.

(21) Appl. No.: 10/547,375

(22) PCT Filed: Feb. 14, 2004

(86) PCT No.: PCT/DE2004/000278

§ 371 (c)(1), (2), (4) Date: Nov. 9, 2006

(87) PCT Pub. No.: WO2004/078564

PCT Pub. Date: Sep. 16, 2004

(65) Prior Publication Data

US 2007/0145776 A1    Jun. 28, 2007

(30) Foreign Application Priority Data

Mar. 3, 2003    (DE) ................................ 103 09 369

(51) Int. Cl.
*B62D 35/00*    (2006.01)

(52) U.S. Cl. ................................. 296/180.5; 296/180.1

(58) Field of Classification Search .............. 296/180.1, 296/180.5, 180.3, 180.2; 180/903
See application file for complete search history.

(56) References Cited

U.S. PATENT DOCUMENTS

| 4,674,788 | A | * | 6/1987 | Ohmura et al. | ........... | 296/180.5 |
|---|---|---|---|---|---|---|
| 5,120,105 | A | * | 6/1992 | Brin et al. | ................ | 296/180.5 |
| 5,141,281 | A | * | 8/1992 | Eger et al. | ................ | 296/180.5 |
| 5,876,088 | A | * | 3/1999 | Spears | ..................... | 296/180.5 |
| 6,378,932 | B1 | * | 4/2002 | Fasel et al. | ............... | 296/180.5 |
| 2004/0256885 | A1 | * | 12/2004 | Bui | ........................ | 296/180.5 |

FOREIGN PATENT DOCUMENTS

DE    4207658 A1 *  9/1993  .............. 296/180.5

* cited by examiner

*Primary Examiner*—Jason S Morrow
(74) *Attorney, Agent, or Firm*—Howrey LLP

(57) ABSTRACT

A motor vehicle is equipped with at least one aerodynamic spoiler that can be extended by a drive system. The spoiler includes an air deflector panel which is supported by an articulated raising mechanism. The raising mechanism holds the air deflector panel in position and includes a plurality of swivel levers. At least one swivel lever of the plurality of swivel levers has a sectionalized design and is positioned in a middle of the retractable raising mechanism when the air deflector panel is fully extended.

7 Claims, 7 Drawing Sheets

MOTOR VEHICLE WITH AT LEAST ONE AERODYNAMIC SPOILER

This invention relates to a motor vehicle equipped with at least one retractable spoiler that includes an air deflector panel.

DE 43 05 090 A1 describes a motor vehicle whose retractable air deflector, often referred to as a spoiler blade, when extended, is supported by a tiltable extension arm which on its part can be swiveled around an axis that slides in the longitudinal direction of the vehicle and pivots around a horizontal axis inside the vehicle. The extension arm includes a linkage assembly in which a suitably profiled slide can be moved by the extension and retraction of a hydraulic drive unit, thus tilting and shifting the extension arm. In the extended position of the spoiler it is not only the weight of the spoiler blade itself that bears down on the extension arm but, especially at higher speeds, the air pressure as well. Therefore, to avoid an unintended retraction and a corresponding lowering of the spoiler blade, the extension arm must remain exposed to the force applied by the drive unit. That requires a relatively large drive unit which in turn limits the available space—often trunk space in the case of a rear spoiler. Moreover, the drive unit itself will be heavy.

To address that problem it is the objective of this invention, for a motor vehicle with a retractable spoiler, to secure the extended position of the air deflector by simple structural means.

The problems mentioned above may be solved with a motor vehicle as described in the present invention.

According to the present invention, pressure bearing on the extended air deflector panel may not cause the raising mechanism to buckle but can instead maintain the air deflector panel in a fully extended state due the position of swivel levers of the raising mechanism. In other words, the maximum extension provides for the raising mechanism a stable equilibrium without any additional hardware. Any pressure on the air deflector panel contributes to that equilibrium, thus, relieving the load on the drive unit.

It is desirable to prop up the raising mechanism by means of a stop, thus taking the load off the drive shaft. That stop is so positioned that, when pressure is exerted on the air deflector panel, it inhibits any reverse movement of the raising mechanism that would retract the air deflector panel. This in turn allows the drive shaft, with the air deflector panel fully extended, to be moved into an idle position instead of having to perform the function of securing the spoiler in its fully extended state. Moreover, the swivel drive can thus be smaller in size.

The necessary stabilization enhancement can be implemented in particularly simple fashion by means of a crank drive in which the joint connecting the crank with a coupling link can rest on a support surface once the dead-center point has been passed. The joint may have a convex outward protrusion, holding it securely in a matching concave support socket.

It will be particularly desirable to be able to move the components of the raising mechanism by swivel action alone without having to compensate for translational slack. This simplifies the design and makes the raising mechanism more dependable while also minimizing the space requirements for, and number of, components of the latter.

Other advantages and features of the invention will be evident from an implementation example of the object of this invention illustrated in the drawings and described below.

In the drawings—

Figure 1:
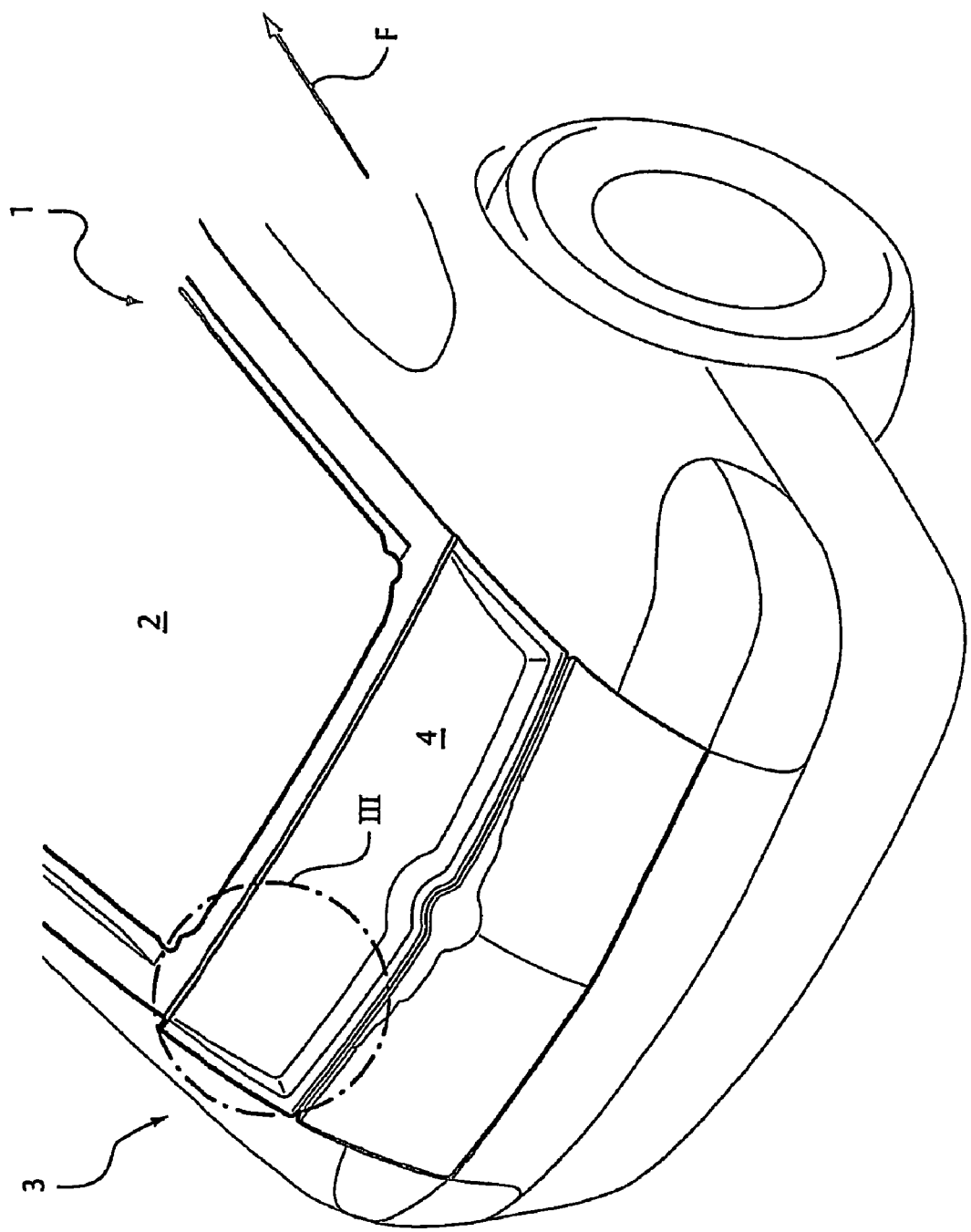
FIG. 1 is a perspective view showing only the aft section of a motor vehicle according to the invention, with its air deflector panel retracted.

The aft section of the motor vehicle 1 illustrated in FIG. 1 is provided, underneath a rear window 2, with a spoiler system 3 that comprises a movable air deflector panel 4, frequently also referred to as a spoiler panel or spoiler blade.

In addition or as an alternative, a spoiler according to the invention may be positioned in other locations on the vehicle 1, for instance above the rear window 2 or in the front area. The vehicle may be a closed sedan, a coupe or convertible.

The overall spoiler system 3 is designed as a module and includes a base plate 6 that can be mounted in a cutout of the vehicle body—for instance attached via screws 5—and serves to support all moving parts of the spoiler system 3. Mounted on the base plate 6 is at least one drive unit 7 such as a hydraulic or electric drive capable of turning a rotary shaft 8 that extends in the transverse direction of the vehicle 1 and drives a raising mechanism 9 for the air deflector panel 4.

Depending on the width of the air deflector panel 4, the raising mechanism 9 may encompass over the width of the vehicle one or several articulated linkages 10 that support and move the air deflector panel 4. In the implementation example two identical linkages 10, serving as moving elements, are provided symmetrically relative to a vertical longitudinal center plane of the vehicle.

These moving elements are capable of alternating the air deflector panel 4 between its home position, shown in FIG. 1, in which it is flush with the outer surface of the vehicle body, and its extended position in which the spoiler panel 4 is shifted rearward and held in place in a raised state.

This shifting operation can be set in motion automatically for instance upon reaching a speed threshold, and additionally, or alternatively, by remote control from the dashboard. Intermediate positions between full extension and full retraction are generally possible.

Figure 3:
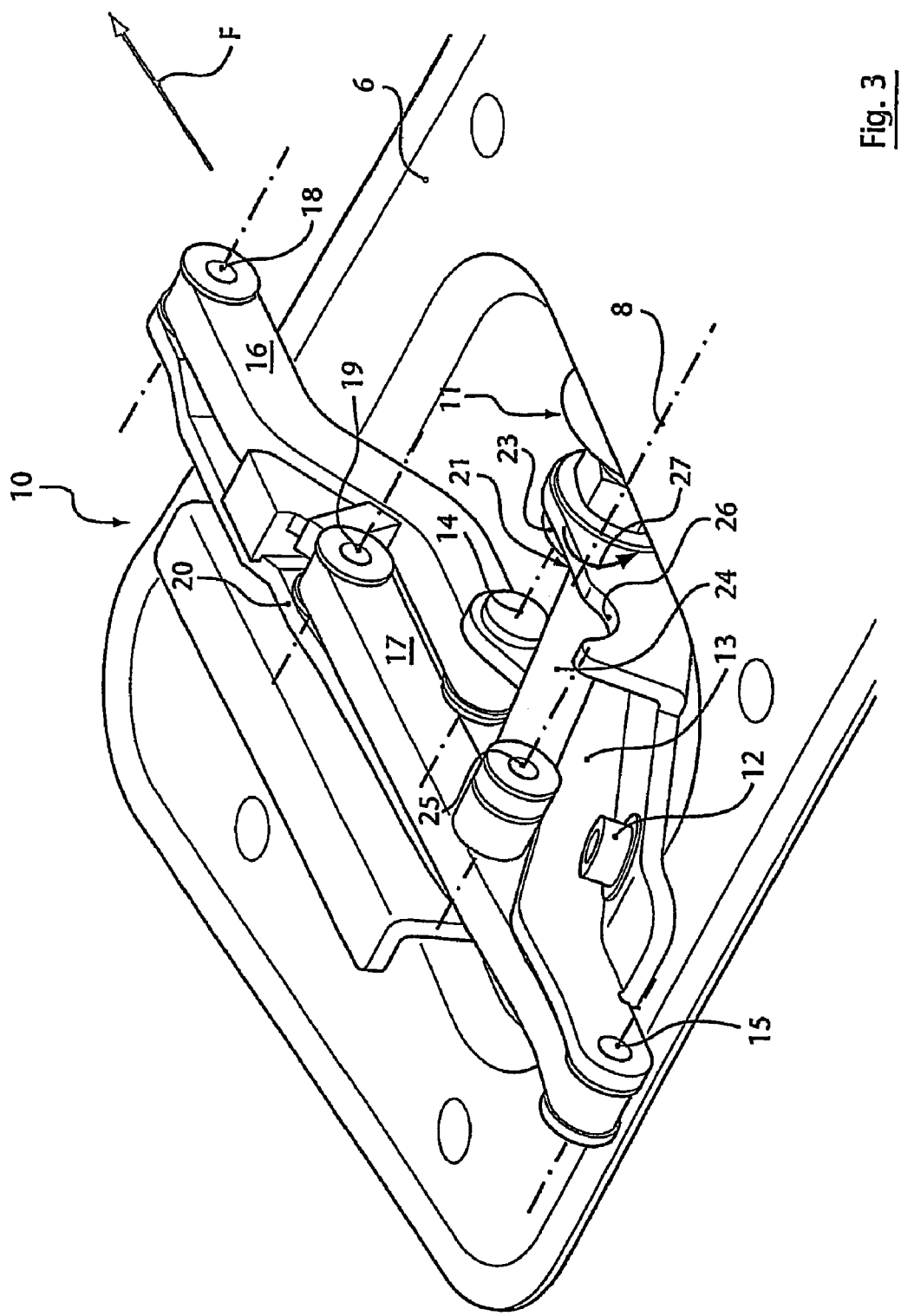
FIG. 3 shows in detail a raising mechanism on the left longitudinal side of the vehicle, its position reflecting that in FIG. 1 and roughly corresponding to detail III in FIG. 1, but without the air deflector panel in place.

FIG. 3 shows in detail one of the two lateral linkages 10 in its home position. The linkage 10 itself can be preinstalled and is supported as a unit in a tub-shaped recess 11 of the base plate 6, perhaps attached with screws 12. The drive shaft 8 extends through a wall in the recess 11 in order to engage in the linkage 10. It includes a fixed bracket 13 that extends in the longitudinal direction of the vehicle and is attached to the bottom of the recess 11, supporting in the forward direction F, via a front joint 14 and a rear joint 15, two tiltable swivel levers 16, 17.

Both joints 14, 15 are non-rotatable relative to the vehicle body, i.e. except for a directional rotation of the swivel levers 16, 17 they allow no other movement, which simplifies the overall configuration of the linkages 10. At their ends facing away from the joints 14, 15, the swivel levers 16, 17 engage in two other joints 18, 19 of an upper bracket 20 which on its part directly or indirectly reaches under the spoiler blade 4 and supports it. All together, the brackets and levers 13, 20, 16, 17 connected to the joints 14, 15, 18, 19 thus constitute a four-bar linkage which, while not a must, makes for a simple and dependable movement assembly. The four-bar linkage forms an articulated parallelogram.

To open or close the linkages 10, extending or retracting the spoiler blade 4, an additional swivel lever 21 is provided that is positioned on the drive shaft 8 and extends from there to the rearward swivel lever 17. It is this additional swivel lever 21 that transmits the motive force. Internally, at a joint 22, it is divided into a crank section 23 that extends from the drive shaft 8 to the joint 22, and a coupling element 24 that extends from there to the swivel lever 17. In another joint 25 it engages in the swivel lever 17. Since the sectionalized swivel lever 21 as well can only move in a specific rotational direction, the entire raising mechanism 9 consists of components that can rotate only relative to one another. No translational movement is needed.

The articulated linkage system 10 additionally encompasses a fixed, body-mounted backstop 26 in the form of a concave socket serving to support the convex joint 22.

Figure 2:
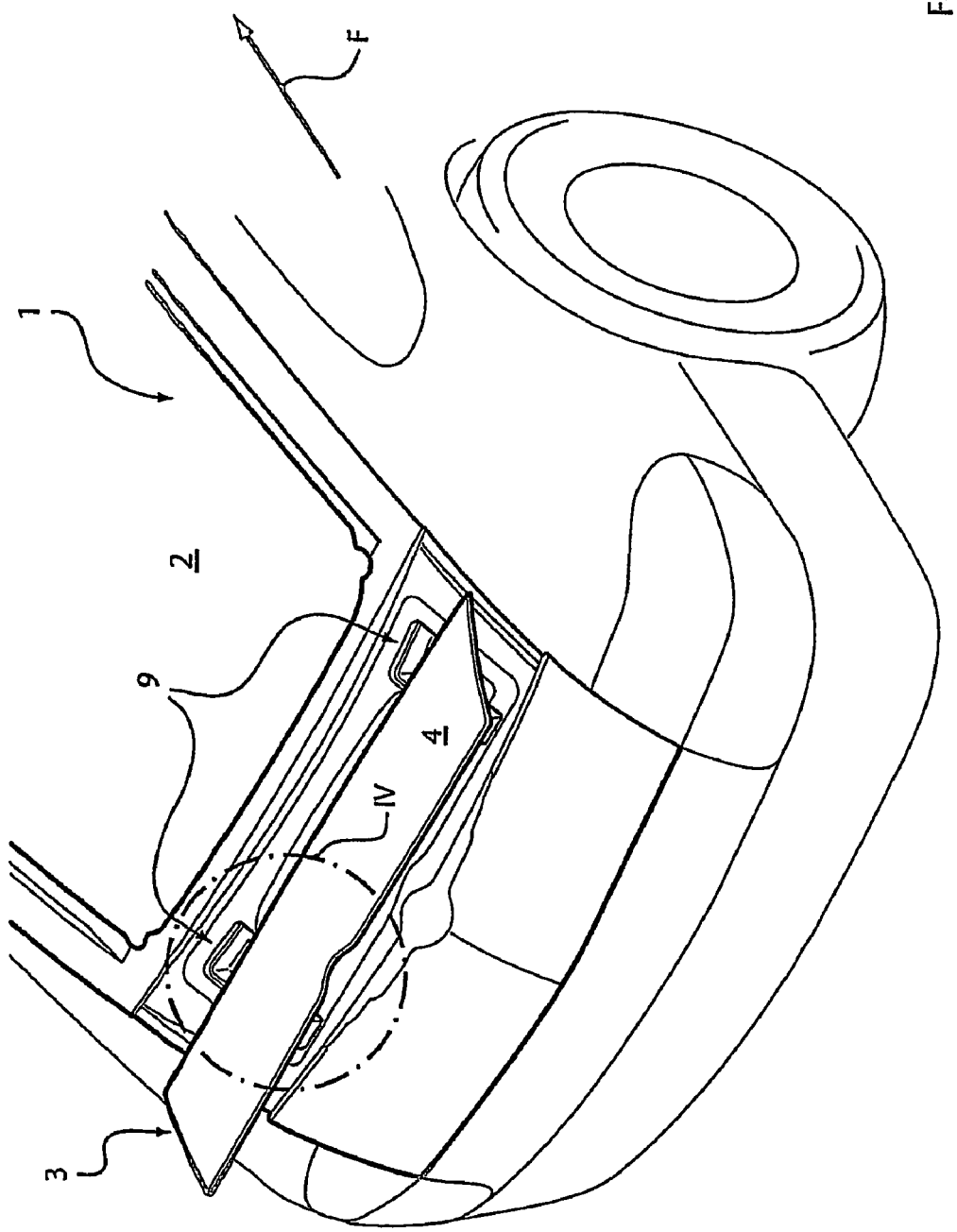
FIG. 2 is a similar view as in FIG. 1, with the air deflector panel extended.
Figure 4:
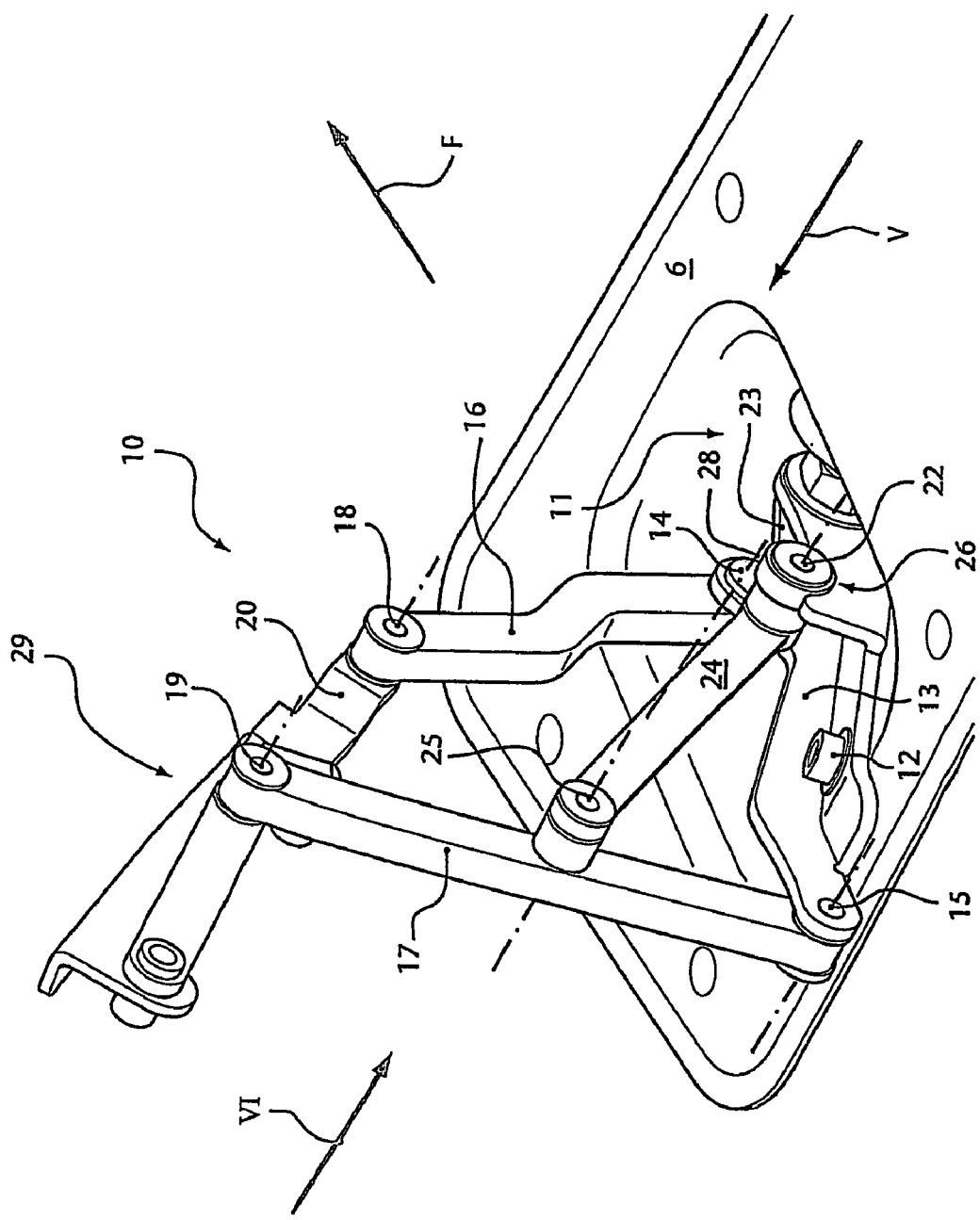
FIG. 4 shows in detail a raising mechanism on the left longitudinal side of the vehicle, its position reflecting that in FIG. 2 and roughly corresponding to detail IV in FIG. 2, but without the air deflector panel in place.
Figure 5:
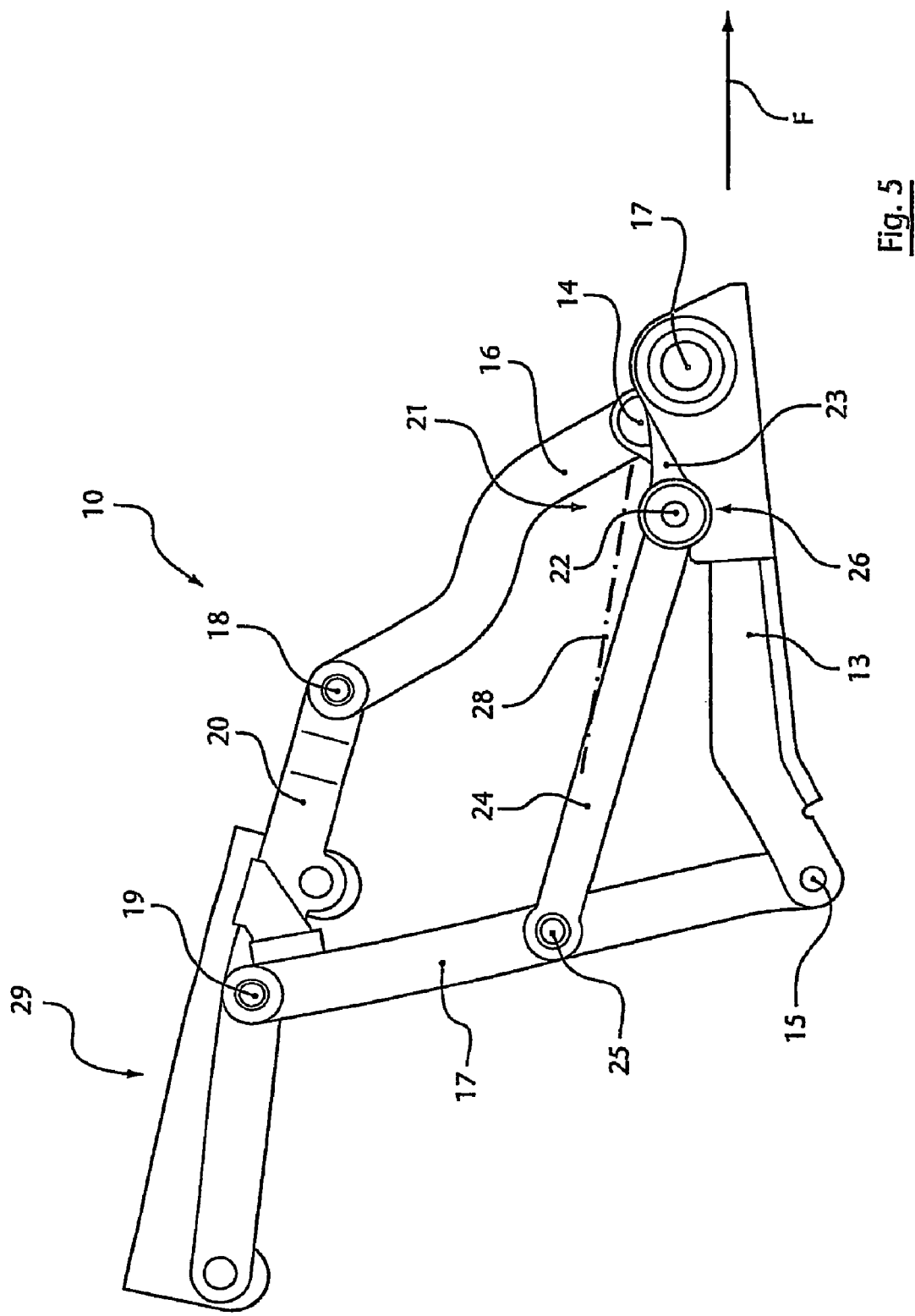
FIG. 5 is a view, from the direction of the arrow V in FIG. 4, of the extended raising mechanism.

To shift the spoiler blade 4 from its home position to its fully extended position (transition from FIG. 1 to FIG. 2 and from FIG. 3 to FIG. 4), the drive shaft 8 is rotated in the direction of the arrow 27. This will move the crank section 23 accordingly, opening the joint 22 as a result of which the coupling element 24 is essentially shifted against the forward direction F and is slightly raised. By engaging in the swivel lever 17, it opens up the four-bar link 13, 16, 17, 20 that forms an articulated parallelogram. Apart from the swivel lever 21 no further interaction is needed between the four-bar link and the drive shaft 8. Just prior to reaching their final position as shown in FIG. 4, the crank and coupling elements 23, 24 attain a linear dead-center position relative to each other (indicated by a dashed line 28). This unstable state causes the swivel lever 21 to drop into its final position, shown in FIGS. 4 and 5, in which the joint 22 is held in the backstop socket 26. In lieu of this fixed, body-mounted backstop 26 it would also be possible to secure the components 23, 24 relative to each other by appropriate stops for these elements.

When pressure is applied on the spoiler blade 4 in the direction of the arrow 29, the force acting on the raising mechanism is no longer unidirectional but, instead, it works in a manner whereby the joint 22 is pushed in the direction of the backstop 26. This and the fact that any retractive movement would initially require a forced overcoming of the dead-center position provides a double positional lock in the final, fully extended state.

Figure 6:
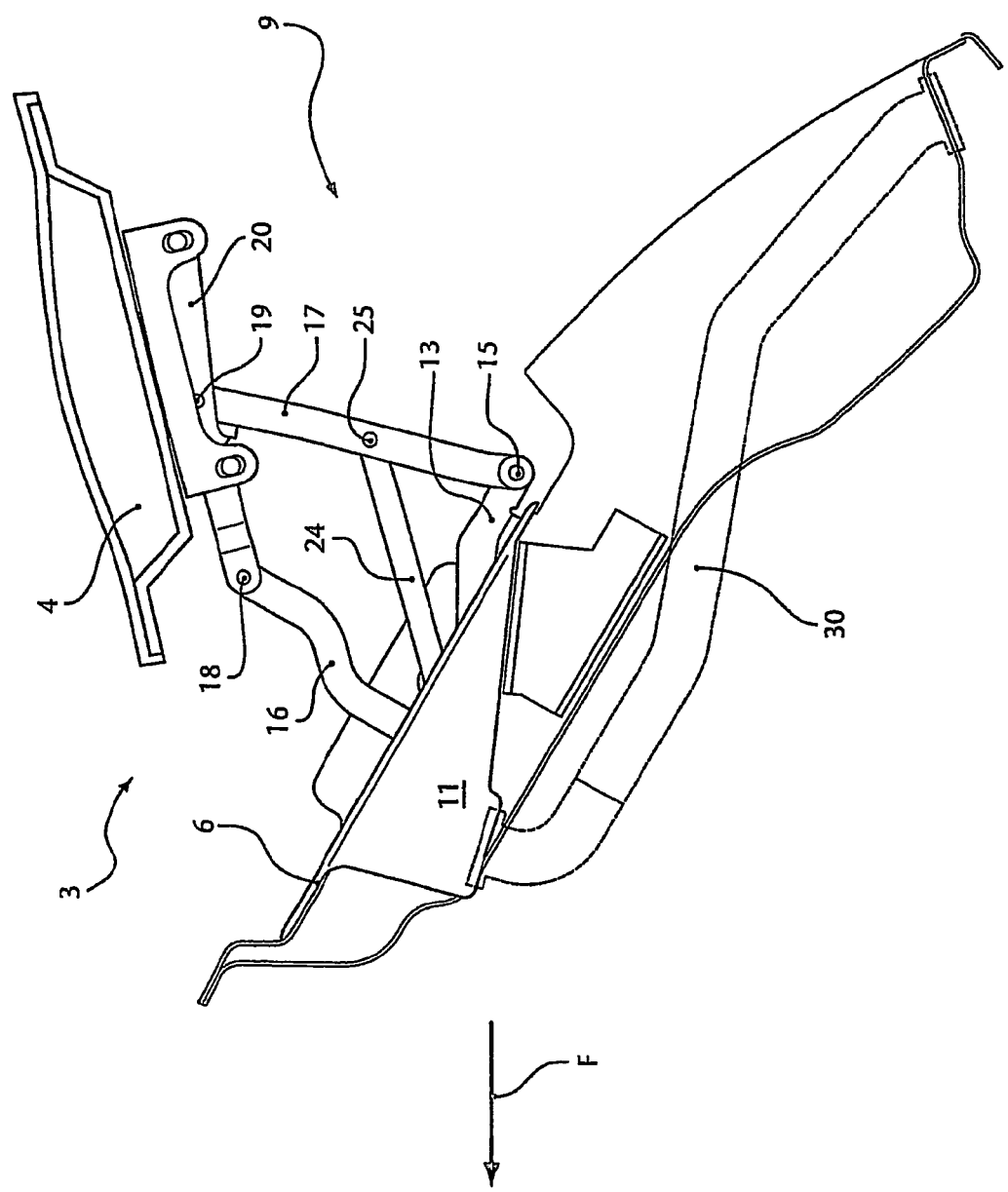
FIG. 6 is a view, from the direction of the arrow VI in FIG. 4, of the spoiler system with the raising mechanism extended.
Figure 7:
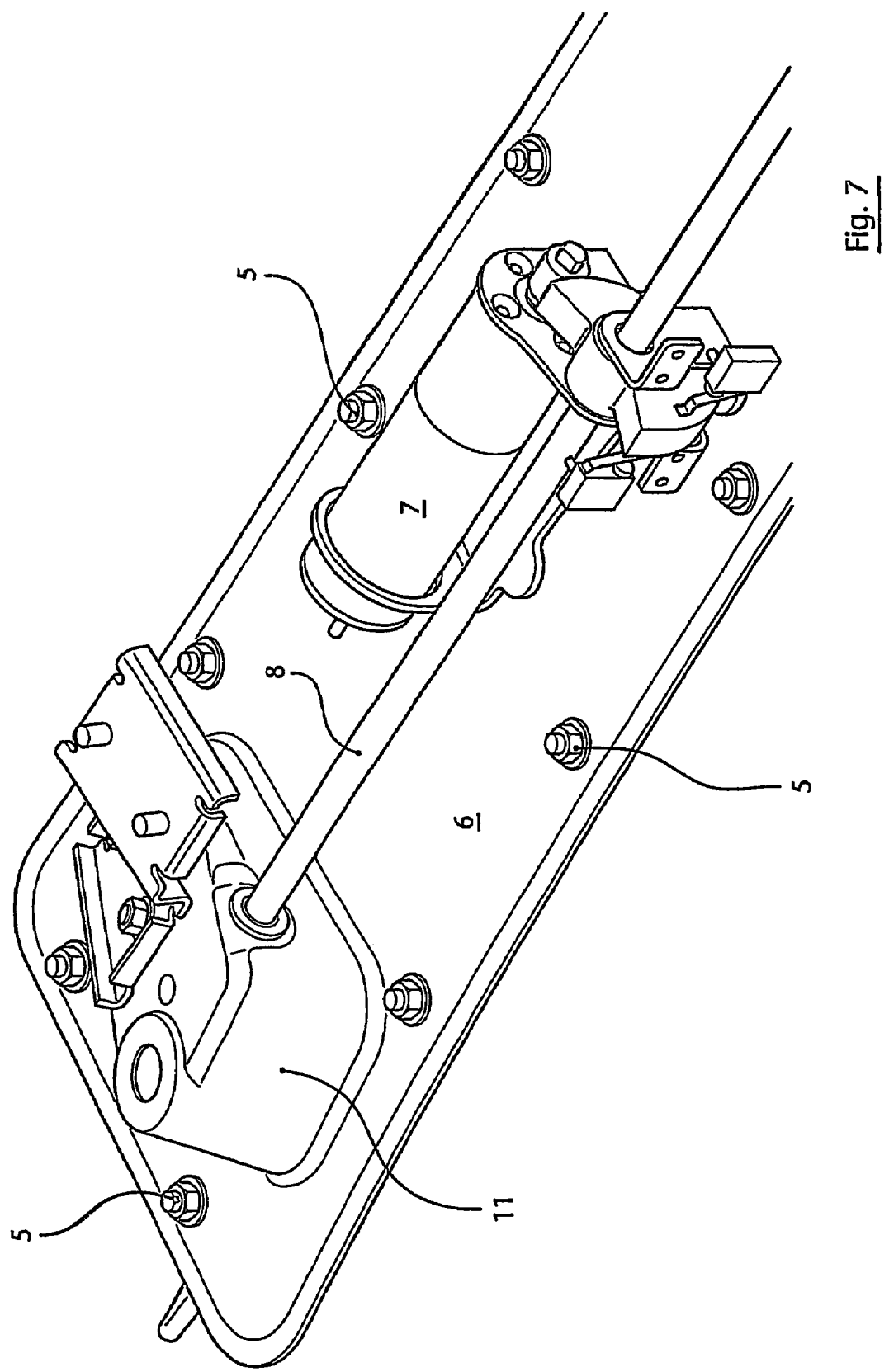
FIG. 7 is a perspective view of a support panel serving as the mounting base for the drive unit moving the raising mechanism and for the power-transmitting components.

As can be seen in FIG. 6, the spoiler system 3 is further provided with a rain drain 30, permitting its modular, simplified installation in the vehicle body and eliminating the need for additional assembly operations.

The invention claimed is:

1. A spoiler for a motor vehicle, comprising:
an air deflector panel;
a retractable raising mechanism attaching the air deflector panel on the motor vehicle and including a plurality of first swivel levers forming a trapezoid when the retractable raising mechanism is in an extended position;
an additional swivel lever being positioned within the area defined by the trapezoid and attached to at least two swivel levers of the plurality of first swivel levers; and
a drive unit for moving the retractable raising mechanism from a retracted position to an extended position,
wherein the air deflector panel is positioned and formed such that when motor vehicle is moving substantially forward and the retractable raising mechanism is in a fully extended position, air pressure exerted on the air deflector panel and transferred through the retractable raising mechanism allows the drive unit to operate in an idle state.

2. The motor vehicle as claimed in claim 1, further comprising at least one backstop to support the additional swivel lever when the air deflector is fully extended.

3. The motor vehicle as claimed in 2 wherein the additional swivel lever is divided by a split joint into a crank section directly tilted by a swivel drive shaft and an outer coupling element facing the air deflector panel, the split joint being supported by the at least one backstop.

4. The motor vehicle as claimed in claim 1, wherein the retractable raising mechanism forms an articulated parallelogram activated by the additional swivel lever.

5. The motor vehicle as claimed in claim 1, wherein the additional lever is operationally connected to the drive unit.

6. The motor vehicle as claimed in claim 1, wherein the retractable raising mechanism is moved in a rotational direction.

7. The motor vehicle as claimed in claim 1, wherein the retractable raising mechanism comprises at least one linkage to support and move the air deflector panel.

* * * * *